United States Patent Office 2,866,080
Patented Dec. 23, 1958

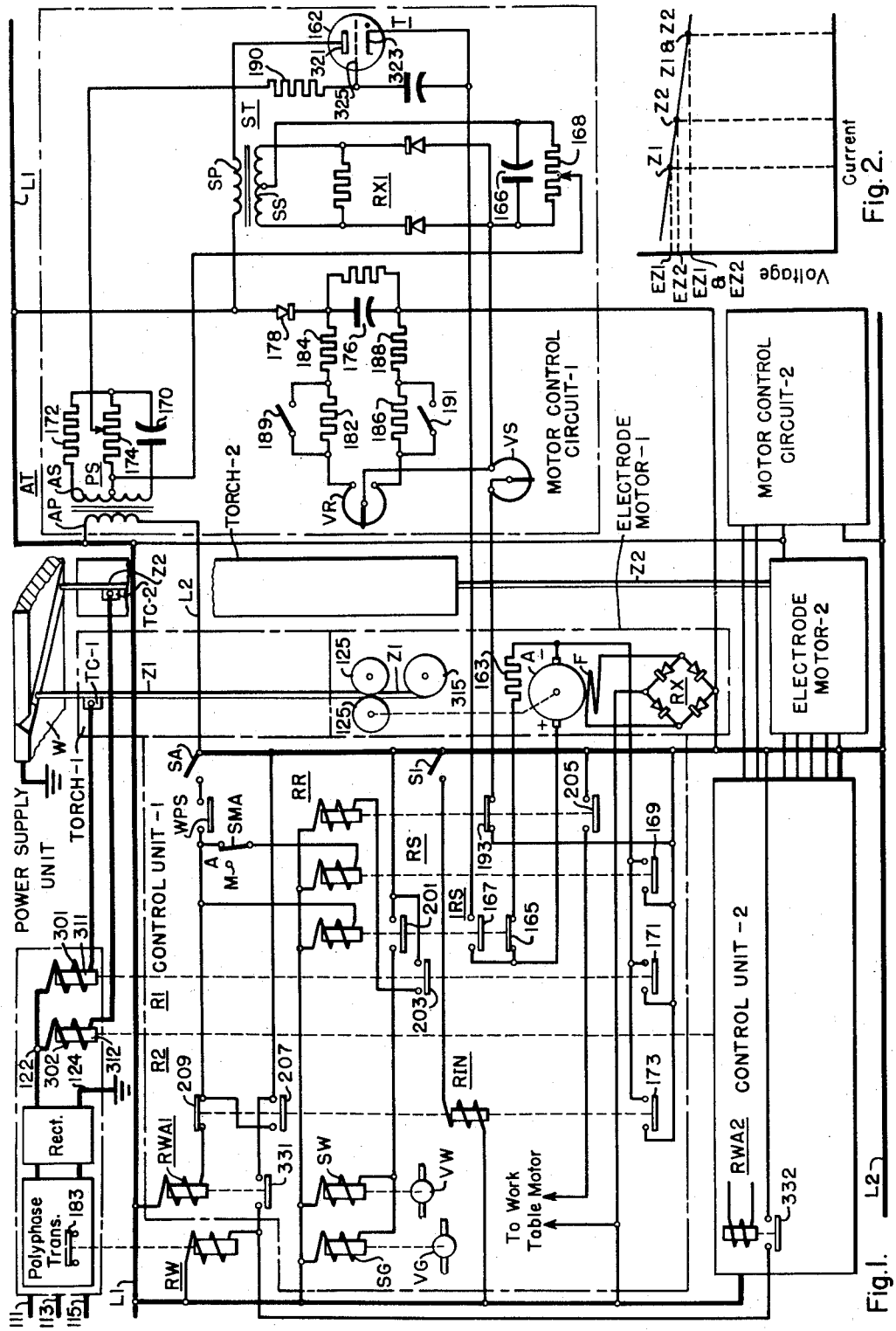

2,866,080

ELECTRIC ARC WELDING

Edward R. Gamberg, Tonawanda, N. Y., and James M. Cameron, Berwick, Pa., assignors to Westinghouse Electric Corporation, East Pittsburgh, Pa., a corporation of Pennsylvania Application May 18, 1956, Serial No. 585,876

5 Claims. (Cl. 219—131)

This application relates to electric arc welding and has particular relation to multiple-arc welding.

In multiple-arc welding the weld bead is deposited by a plurality of arcs burning simultaneously between a plurality of welding electrodes and the work. Usually the arcs operate in a common pool. Multiple-arc welding has the advantages that the bead may be deposited at a higher rate than with a single arc. This advantage is of particular importance when the welding is in an inert gas. In this case the rate of deposit with a single arc is usually low compared to the rate in submerged arc welding but in welding with multiple arcs in an inert gas, the rate may be so increased that it approaches or exceeds the rate in submerged arc welding.

Multiple-arc welding apparatus, in accordance with the teachings of the prior art, requires separate power supply units for each of the arcs. The cost of the additional units so increases the cost of this apparatus that frequently the increased rate of deposit achieved does not warrant the cost of achieving it. In addition, the operation is complex, the power supply units interact through the arcs when they operate in a common pool and the interaction impairs the operation of the units.

It is accordingly broadly an object of this invention to provide multiple-arc welding apparatus which shall not have the disadvantages of high cost and complexity of operation of the prior art apparatus.

Another object of this invention is to provide such multiple-arc welding apparatus for welding with consumable electrodes.

A further object of this invention is to provide such apparatus for welding in a shield of non-reactive gas.

A specific object of this invention is to provide low cost apparatus relatively simple in its structure and operation for welding with a plurality of arcs operating in an inert-gas shield between consumable electrodes and the work.

In accordance with this invention, multiple-arc welding apparatus is provided in which the separate arcs are supplied in common from a single power supply unit, the unit being of the type having a voltage-current characteristic which does not have a substantial droop. Preferably the characteristic should be substantially flat so that during operation the voltage between the output terminals of the unit is substantially constant or independent of the arc current over a wide range of arc currents flowing through the terminals. The limits of this range are such that arc welding current may be supplied either to one or all of a plurality of welding arcs without materially changing the potential available between terminals. A suitable power supply unit is disclosed in Patent 2,786,160, granted March 19, 1957, to Harry J. Bichsel. In accordance with the broader aspects of this invention the arcs may also be supplied from a power supply unit having a rising characteristic so that the voltage between the terminals of the unit increases as the current through them increases.

In accordance with this invention in its specific aspects the welding arcs are produced between consumable electrodes and the work, the consumable electrodes operating in a common pool, and the arcs being sheathed in a shield of a non-reactive gas which may be an inert gas or such a gas as carbon dioxide. Each of the electrodes is supplied through a torch and for each electrode control apparatus is provided to control its movement into the arc in such manner that the desired rate of deposit is achieved. The control apparatus for each electrode operates independently of the apparatus for the others so that the deposit may be set in each case independently.

The supply of welding current by the common power supply unit is controlled by solenoid actuable switch means. In accordance with this invention the control apparatus for each electrode includes means for actuating the switch means of the common unit so that the switch means may be actuated by the control apparatus associated with any electrode independently of the others and the welding may proceed with an arc between one or any number of the electrodes and the work. The power supply unit is coordinated with the control apparatus through current relays responsive to the welding current. A separate relay is associated with each of the arcs and the control apparatus associated with the corresponding electrode is controlled in accordance with the flow of current through its arc independently of the others.

The novel features considered characteristic of this invention are described generally above. The invention itself, both as to its organization and its method of operation, together with additional objects and advantages thereof will be understood from the following description of a specific embodiment when read in connection with the accompanying drawings, in which:

Figure 1 is a circuit diagram showing a preferred embodiment of this invention; and Fig. 2 is a graph illustrating the operation of the power supply unit of the apparatus shown in Fig. 1.

The apparatus shown in Fig. 1 is a multiple-arc welding system which operates to deposit a weld bead between consumable welding electrodes Z1 and Z2 and work W. This apparatus includes a Power Supply Unit, a plurality of Welding Torches which are adapted to supply the consumable electrodes Z1 and Z2, and control apparatus for controlling the movement of the electrodes relative to the work W. The control apparatus for each of the electrodes Z1 and Z2 is of the general type disclosed in application Serial No. 556,143, filed December 29, 1955, to Harry J. Bichsel and Alfred J. Baeslack. This apparatus includes a separate Control Unit for each of the electrodes Z1 and Z2, a separate Electrode Motor for each, and separate Motor Control Circuits for each of the motors. The Torches, Control Units, Electrode Motors and Motor Control Circuits for the electrodes Z1 and Z2 are identified in the drawing by the numerals 1 and 2. The apparatus shown in Fig. 1 is supplied with power from conductors 111, 113, 115 which may be connected to the supply conductors of a commercial polyphase supply and by the conductors L1 and L2 which may be energized through suitable step-down transformers from two of the phase conductors 111, 113, and 115.

The Power Supply Unit may be of the type disclosed in the above mentioned Bichsel Patent 2,786,160. The latter is of the polyphase rectifier type including a polyphase transformer adapted to be supplied from the conductors 111, 113 and 115 and a rectifier supplied from the transformer. Power is derived from the Unit through a pair of output terminals 122 and 124. The voltage current characteristic of this unit is such that the voltage between the terminals 122 and 124 remains substantially constant over a wide range of current conducted through the terminals. The terminal 124 is grounded and is thus connected to the work W which is also grounded. The terminal 122 is connected through the coils 301 and 302 of current relays R1 and R2 to the electrodes Z1 and Z2, respectively. The coils 301 and 302 may be single loops around the cores 311 and 312 of the relays or even the portions of the conductors between the terminal 122 and the electrodes Z1 and Z2. Current relay R1 has normally open contacts 171 and 203 in Control Unit-1; current relay R2 has similar contacts (not shown) in Control Unit-2.

The Power Supply Unit is controlled from a relay RW which is adapted to actuate switch means 183 in the Power Supply Unit (see Bichsel 2,786,160). When the switch means is actuated a voltage appears between the terminals 122 and 124.

The Torches-1 and -2 may be of the type disclosed in Patent 2,813,193, granted November 12, 1957, to Harry J. Bichsel. Each includes a channel for transmitting the electrodes Z1 and Z2, respectively, and contact means TC–1 and TC–2 for making electrical contacts with the electrodes Z1 and Z2. The contact means TC–1 and TC–2 are connected to terminal 122 through the coils 301 and 302, respectively. The electrode drive for only one of the electrodes Z1 is shown. This drive includes a pair of rollers 125 driven from the associated Electrode Motor-1 to advance the electrode Z1 from the supply reel 315 through Torch-1 to the work W. The electrode Z2 is similarly driven. The Torches-1 and -2 also each includes channels for circulating cooling water and for transmitting shielding gas.

Of the Electrode Motors-1 and -2, only the Electrode Motor-1 for the electrode Z1 is shown in detail. This Motor is of the shunt type including an armature A and a shunt winding F, the latter being supplied from the conductors L1 and L2 through a rectifier RX. The armature A is adapted to be shunted by a braking resistor 163 through the normally closed contacts 165 of a relay 1RS in the Control Unit-1.

Of the Motor Control Circuit for the electrodes Z1 and Z2 only the Motor Control Circuit-1 for electrode Z1 is shown. This Circuit includes a thyratron T having an anode 321, a cathode 323 and a control electrode 325. The Motor Control Circuit also includes a series transformer ST having a primary SP and a center tapped secondary SS. The anode 321 of thyratron T is connected to the conductor L1 through the primary SP. The cathode 323 is adapted to be connected to the conductor L2 through normally open contacts 167 of the relay 1RS in Control Unit-1, the armature A of Motor-1 and one or more of the normally open contacts 169 of the relay RS in the Control Unit-1, 171 of the current relay R1 and 173 of the inching relay RIN in the Control Unit-1.

The control potential for the thyratron T is composite. It includes a direct current bias derivable from capacitor 176 which is connected through a rectifier 178 between the conductors L1 and L2. This bias potential may be set at a desired magnitude for normal operation by a variable resistor VR, the terminals of which are connected across the capacitor 176 through resistors 182 and 184 and 186 and 188, respectively. The resistors 182 and 186 may be shunted out by switches 189 and 191. For slow starting the variable resistor VS is provided. This resistor is adapted to be connected between the adjustable arm of the resistor VR and the conductor L2 through normally closed contacts 193 of a relay RR in Control Unit-1. The control potential also includes a ripple having a predetermined phase displacement relative to the potential between conductors L1 and L2 derivable from a phase shift network PS. This network PS is supplied by the transformer AT which includes a primary AP connected between the conductors L1 and L2 and a secondary AS having an intermediate tap. Across the terminals of the secondary AS, a capacitor 170 and a resistor 172 are connected in series. A variable resistor 174 is connected between the junction of the capacitor 170 and the resistor 172 and the intermediate tap. The control potential also includes a direct current component proportional to the current flowing through the anode circuit of the thyratron derived from the secondary SS. The secondary SS is connected through a rectifier RX1 across the capacitor 166. The capacitor is shunted by a resistor 168 which sets the magnitude of the direct current potential. The control potential also includes the voltage drop across armature A.

During normal operation the above described components are impressed between the control electrode 325 and the cathode 323 in a circuit extending from the control electrode 325 through a grid resistor 190, the variable resistor 174, the variable resistor 163, the variable resistor VR to the conductor L2 and thence through the contacts 169, 171 or 173 through the armature A and contacts 167 to the cathode 323. During starting the variable resistor VS is connected in the circuit through the contact 193.

Of Control Units-1 and -2 only Control Unit-1 is shown in detail. This Control Unit includes, in addition to the relays RR, RS, 1RS and RIN a relay RWA1 and solenoids SW and SG which control the supply of cooling water and gas through Torch-1. The relay RR includes, in addition to the contact 193, a contact 205 adapted to connect a work motor, if one is included in the apparatus, between the conductors L1 and L2. The coil of relay RR is adapted to be connected between conductors L1 and L2 through the normally open contacts 203 of current relay R1. The relay 1RS includes, in addition to the contacts 165 and 167, a normally open contact 201 adapted to connect the solenoids SG and SW between the conductors L1 and L2. The relay RIN includes, in addition to the contact 173, a normally open contact 207 and a normally closed contact 209. The opening of contact 209 during inching prevents the actuation of the relay RWA1. The closing of contact 207 conditions the coils of relays RS and 1RS to be connected between conductors L1 and L2 during inching. The relay RWA1 includes a normally open contact 331 which is adapted to connect the coil of relay RW between the conductors L1 and L2 and thus to actuate the relay RW and its associated switching means 183. The solenoids SG and SW actuate the gas and cool-water supplies to the Torch T1.

Control Unit-1 also includes a selector switch SMA adapted to set the Unit either for manual or automatic operation, a starting switch SA and an inching switch SI. As shown in the drawing, the switch SMA is set for automatic operation.

The coil of relay RS is adapted to be connected between the conductors L1 and L2 through the switch SMA, water pressure switch WPS, which is closed if the water pressure is adequate, and switch SA. The coil of relay 1RS is adapted to be connected between the conductors L1 and L2 through the pressure switch WPS and the switch SA. The coil of relay RWA1 is adapted to be connected between conductors L1 and L2 through normally closed contact 209, pressure switch WPS and switch SA. The coil of relay RIN is adapted to be connected between conductors L1 and L2 through inching switch S1.

In the standby condition of the apparatus, the switches SA and S1 and the corresponding switches for the electrode Z2 are open. Relays RWA1 and RWA2 are then de-energized and relay RW is de-energized so that there is no potential between the terminals 122 and 124. Current relays R1 and R2 are then de-energized and contacts 171 and 203 and the corresponding contacts in Control Unit-2 are open. Since contacts 203 in Control Units-1 and -2 are open, the associated relays RR are de-energized and the associated variable resistors VS are connected in the Motor Control Circuits-1 and -2. Since the switches SA for electrodes Z1 and Z2 are open, relays RS and 1RS are de-energized and the contacts 169, 201 and 167 in Control Units-1 and -2 are open and the contacts 165 in Control Units-1 and -2 are closed. The Electrode Motors-1 and -2 are then at rest.

At the start of a welding operation the electrodes Z1 and Z2 are threaded into the Torches-1 and -2 and the Torches are set with respect to the work W so that the electrodes Z1 and Z2 will operate in a common pool. This setting may be effected with the aid of the inching switches S1 in Control Units-1 and -2. When either of these switches is actuated, the associated relay R1N is actuated, contacts 173 and 207 are then closed and contact 209 is opened. The closing of a contact 173 closes an open connection in the associated Motor Control Circuit. The closing of contact 207 connects the coil of the associated relay 1RS in a circuit extending from conductor L2 through contact 207, switch SMA, the coil of relay 1RS to conductor L1. Relay 1RS is then actuated, opening at contact 165 the braking circuit 163 across the armature A of the associated Electrode Motor and closing the circuit through the armature at contact 167. The associated Electrode Motor is then energized. Since at this time the associated variable resistor VS is connected in the control circuit of the associated thyratron T the supply of current to the Motor is of a lower magnitude and the Motor rotates slowly, permitting accurate setting of the electrode. The inching switches S1 in the Control Units-1 and -2 may be actuated independently of each other so that each of the electrodes Z1 and Z2 may be properly set independently of the other. Once the electrodes Z1 and Z2 are properly set relative to the work W, switches S1 in Control Units-1 and -2 are opened so that relays R1 in the two Control Units are de-energized and the Units are reset to the standby condition. The apparatus is now ready for a welding operation.

The operation of the apparatus during welding will be explained with reference to Fig. 2 which presents a voltage-current characteristic for the Power Supply Unit. In this graph voltage is plotted vertically and current horizontally. The slightly downwardly sloping line presents the manner in which the voltage varies as a function of the current over the range of current over which the welding is to take place. It is seen that the voltage decreases at a relatively low rate as the current increases. The rate of decrease is such that the voltage may be regarded as substantially constant over the current range.

To start the welding operation the switches SA in Control Units-1 and -2 are closed. Usually the switch SA for one of the Units, say the Control Unit-1, is closed first and then the switch SA for the other Unit-2 is closed. When the switch SA is closed the relays RWA, RS and 1RS are actuated. The actuation of relay RWA1 closes the normally open contact 331 causing relay RW to be actuated. The switch means in the Power Supply Unit is then actuated and potential appears between the terminals 122 and 124. At this time the electrode Z1 is retracted from the work so that there is no arc between the electrode Z1 and the work W and there is no current flow through the terminals 122 and 124. The actuation of relays RS and 1RS causes the Motor Control Circuit-1 to close and disconnects the braking resistor 163 from the armature A. Motor-1 then rotates, but its speed of rotation is low since at this time contact 193 is closed, connecting the starting variable resistor VS in Motor Control Circuit-1. The direction of rotation of the Motor is such as to feed the electrode Z1 towards the work. Further, since the relay 1RS is now actuated contact 201 is closed and the supply of gas and water to the work is initiated.

The electrode Z1 now advances toward the work and eventually comes into contact with the work, igniting an arc. Current now flows through the coil of relay R1, closing the contact 171 and the contact 203. At the contact 203 relay RR is actuated, disconnecting the resistor VS from the control circuit of thyratron T and also connecting the work table motor to the power supply. Electrode Z1 now continues to be supplied to the arc at a speed determined by the variable resistor VR. The operation may now be represented by the point labeled Z1 in Fig. 2, the arc current corresponding to the current ordinate of point Z1 and the voltage between 122 and 124 to the voltage ordinate.

Once this arc is fired an arc between electrode Z2 and the work may be similarly ignited by closing the switch SA in Control Unit-2. The closing of this switch has the same effect with reference to electrode Z2 as the closing of switch SA in Control Unit-1 had with reference to Z1. In this case the relay RWA2 in Control Unit-2 is actuated but this has no effect since the relay RW has been energized through the contacts 331 of relay RWA1.

The closing of the switch SA of Control Unit-2 causes the electrode Z2 to engage the work W and as a result an arc is ignited between electrode Z2 and the work W. The resulting flow of current through the coil of relay R2 causes the associated contacts in Control Unit-2 to close and this sets Control Unit-2 and Electrode Motor-2 to operate in the same manner as Control Unit-1 and Electrode Motor-1. It may be assumed that the operation of Unit-2 is represented by the point labeled Z2 on the voltage-current characteristic shown in Fig. 2. The total current now drawn by the Power Supply Unit is that represented by the point labeled Z1+Z2 in Fig. 2. It is seen that with this total current flowing the voltage of the Power Supply Unit remains substantially the same as for the current flowing only through the electrode Z1 and the work W.

The welding by both arcs in a common pool may now proceed. The deposit of each of the electrodes Z1 and Z2 may be set independently by setting the associated variable resistor VR. and thus the deposit may be adjusted to best suit the circumstances under which the welding is being carried out. The electrodes Z1 and Z2 may be of the same diameter or of different diameters. The available independent adjustment of the deposit permits the use of electrodes of different diameters without serious difficulty. The electrodes Z1 and Z2 may also have different metallurgical composition so that the weld metal will have the desired properties. Since the pool is being supplied from two electrodes Z1 and Z2, the bead may be deposited at a high rate.

While a specific embodiment of this invention has been disclosed herein, many modifications thereof are feasible. The invention, therefore, is not to be restricted except insofar as is necessitated by the spirit of the prior art.

We claim as our invention:

1. Apparatus for arc welding work with a plurality of welding electrodes comprising, in combination, a power supply unit capable of supplying welding arcs and having a pair of output terminals, said unit being of the type having a non-drooping voltage-current characteristic, low-impedance means for connecting one of said terminals to said work, low-impedance means for connecting the other of said terminals to each of said electrodes, and separate means to be connected to each of said electrodes for controlling the movement of each of said electrodes relative to said work so that welding arcs may be ignited and maintained between said electrodes and said work.

2. Apparatus for arc welding work with a plurality of welding electrodes comprising, in combination, a power supply unit capable of supplying welding arcs and having a pair of output terminals, said unit being of the type having a non-drooping voltage-current characteristic, low impedance means for connecting one of said terminals to said work, low impedance means for connecting the other of said terminals to each of said electrodes, separate means to be connected to each of said electrodes for controlling the movement of each of said electrodes relative to said work so that welding arcs may be ignited and maintained between said electrodes and said work, and means for shielding said arcs in a shield of non-reactive gas.

3. Apparatus for arc welding work with a plurality of consumable welding electrodes comprising, in combination, a power supply unit capable of supplying welding arcs and having a pair of output terminals, said unit being of the type having a non-drooping voltage-current characteristic, low-impedance means for connecting one of said terminals to said work, low-impedance means for connecting the other of said terminals to each of said electrodes, separate means to be connected to each of said electrodes for controlling the movement of each of said electrodes relative to said work so that welding arcs may be ignited and maintained between said electrodes and said work and the consumption of said electrodes may be controlled, said controlling means for each of said electrodes being independent of said controlling means for the other of said electrodes so that the consumption of each of said electrodes may be controlled independently of the consumption of the others.

4. Apparatus for arc welding work with a plurality of welding electrodes comprising, in combination, a power supply unit capable of supplying welding arcs and having a pair of output terminals, said unit being of the type having a non-drooping voltage-current characteristic, means for connecting one of said terminals to said work, means for connecting the other of said terminals to each of said electrodes, a current relay associated with each of said electrodes, each relay having coil means and contact means, said connecting means between each of said electrodes and said other terminal including the coil means of the associated current relay, separate means to be connected to each of said electrodes and connected to said contact means of said associated relays for controlling the movement of each of said electrodes relative to said work so that welding arcs may be ignited and maintained between said electrodes and said work, said controlling means for each of said electrodes operating to control the movement of each electrode independently of the others.

5. Apparatus for arc welding work with a plurality of welding electrodes comprising, in combination, a power supply unit capable of supplying welding arcs and having a pair of output terminals, said unit being of the type having a non-drooping voltage-current characteristic, said unit including switch means which when actuated permits a potential for welding to exist between said terminals, means for connecting one of said terminals to said work, means for connecting the other of said terminals to each of said electrodes, and separate means to be connected to each of said electrodes for controlling the movement of each of said electrodes relative to said work so that welding arcs may be ignited and maintained between said electrodes and said work, each of said controlling means including starting switch means which when actuated permits operation of said controlling means and each controlling means also including means responsive to actuation of said starting switch means for actuating said unit switch means, said unit switch means being so actuable responsive to actuation of any one of said starting switch means independently of the others.

References Cited in the file of this patent
UNITED STATES PATENTS

| | | |
|---|---|---|
| 1,340,056 | Kennedy | May 11, 1920 |
| 1,610,920 | Bethanod | Dec. 14, 1926 |
| 1,746,081 | Hobart | Feb. 4, 1930 |
| 1,993,455 | Richards | Mar. 5, 1935 |
| 2,152,785 | Blankenbuehler | Apr. 4, 1939 |
| 2,320,824 | Landis | June 1, 1943 |
| 2,436,387 | Harter et al. | Feb. 24, 1948 |
| 2,489,002 | Babbitt | Nov. 22, 1949 |
| 2,536,294 | Landis et al. | Jan. 2, 1951 |
| 2,655,586 | Schreiner et al. | Oct. 13, 1953 |
| 2,777,047 | Stevens | Jan. 8, 1957 |

FOREIGN PATENTS

| | | |
|---|---|---|
| 584,355 | Great Britain | June 14, 1947 |